United States Patent [19]

Mark et al.

[11] Patent Number: 4,477,647
[45] Date of Patent: Oct. 16, 1984

[54] POLYARYLATE RESIN OF THIODIPHENOLS AND ISOPHTHALIC ACID OR DERIVATIVES THEREOF

[75] Inventors: Victor Mark, Evansville; Charles V. Hedges, Mt. Vernon, both of Ind.

[73] Assignee: General Electric Company, Mt. Vernon, Ind.

[21] Appl. No.: 527,743

[22] Filed: Aug. 30, 1983

[51] Int. Cl.$^3$ .............................................. C08G 63/68
[52] U.S. Cl. .................................... 528/176; 528/193; 528/194
[58] Field of Search ........................ 528/176, 193, 194

[56] References Cited

U.S. PATENT DOCUMENTS

| 3,884,990 | 5/1975 | Sakata et al. | 528/193 |
| 4,102,864 | 6/1978 | Deex et al. | 528/193 |
| 4,171,421 | 10/1979 | Buxbaum | 528/193 |
| 4,281,099 | 7/1981 | Maresca | 528/193 |
| 4,334,053 | 6/1982 | Freitag et al. | 528/194 |

Primary Examiner—Lester L. Lee
Attorney, Agent, or Firm—Myron B. Kapustij; Martin B. Barancik

[57] ABSTRACT

Polyarylate resin compositions exhibiting flame retardancy comprised of at least one polyarylate resin derived from:
(i) at least one aromatic dicarboxylic acid or a reactive derivative thereof; and
(ii) from about 1 to 100 weight percent of at least one thiodiphenol and from 0 to about 99 weight percent of at least one dihydric phenol, based on the total amount of thiodiphenol and dihydric phenol.

6 Claims, No Drawings

POLYARYLATE RESIN OF THIODIPHENOLS AND ISOPHTHALIC ACID OR DERIVATIVES THEREOF

Polyarylates are high molecular weight thermoplastic resins which, due to their many advantageous properties, are finding increasing use as engineering thermoplastic materials in many commercial and industrial applications. Polyarylates are generally linear aromatic polymers containing repeating aromatic ester structural units in the polymer chain. These polyarylates are in general derived from dihydric phenols and aromatic dicarboxylic acids or their reactive derivatives.

While conventional polyarylates are quite suitable for a wide variety of purposes, there nevertheless exists a need for polyarylates exhibiting a greater degree of thick section impact strength and flame retardancy than exhibited by conventional polyarylates.

It is, therefore, an object of the instant invention to provide polyarylates which exhibit improved flame retardancy. It is also preferred to improve flame retardancy while simultaneously exhibiting, to a substantial degree, substantially most of the other advantageous properties of polyarylates.

SUMMARY OF THE INVENTION

The instant invention is directed to novel polyarylates exhibiting improved flame retardancy and thick section impact strengths. These polyarylates are derived from (i) at least one aromatic dicarboxylic acid, and (ii) from 1 to about 100 weight percent of at least one thiodiphenol and from 0 to about 99 weight percent of at least one dihydric phenol, based on the total amount to thiodiphenol and dihydric phenol utilized.

DESCRIPTION OF THE INVENTION

In accordance with the instant invention there are provided polyarylate compositions exhibiting improved flame retardancy and improved thick section impact strengths as compared to conventional prior art polyarylate compositions. The polyarylates of the instant invention are prepared by reacting (i) at least one aromatic dicarboxylic acid, and (ii) from 1 to 100 weight percent of at least one thiodiphenol and from 0 to about 99 weight percent of at least one dihydric phenol, based on the total amount of thiodiphenol and dihydric phenol utilized.

The thiodiphenols useful in the practice of the instant invention are halogen-free and are represented by the general formula

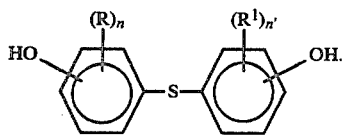

I wherein:

R is independently selected from monovalent hydrocarbon radicals;

$R^1$ is independently selected from monovalent hydrocarbon radicals; and n and n' are independently selected from whole numbers having a value of from 0 to 4 inclusive.

The monovalent hydrocarbon radicals represented by R and $R^1$ are selected from alkyl radicals, cycloalkyl radicals, aryl radicals, aralkyl radicals, and alkaryl radicals.

Preferred alkyl radicals represented by R and $R^1$ are those containing from 1 to about 8 carbon atoms. Some illustrative non-limiting examples of these alkyl radicals include methyl, ethyl, propeyl, isorpoyl, butyl, isobutyl, tertiarybutyl, pentyl, neopentyl, and the like.

Preferred cycloalkyl radicals represented by R and $R^1$ are those containing from 4 to about 7 ring carbon atoms. Some illustrative non-limiting examples of these cycloalkyl radicals include cyclobutyl, cyclopentyl, cyclohexyl, methylcyclohexyl, and cycloheptyl.

Preferred aryl radicals represented by R and $R^1$ are those containing from 6 to 12 carbon atoms. These include phenyl, naphthyl, biphenyl, and the like.

Preferred aralkyl and alkaryl radicals represented by R and $R^1$ are those containing from 7 to about 15 carbon atoms. Some illustrative non-limiting examples of these aralkyl and alkaryl radicals include benzyl, ethylphenyl, propylphenyl, methylnaphthyl, and the like.

In the thiodiphenol compounds of Formula I when more than one R substituent is present they may be the same or different. The same is true for the $R^1$ substituent. The positions of R or $R^1$ and the hydroxyl groups on the aromatic nuclear residues can be varied in the ortho, meta, or para positions and the groupings can be in a vicinal, asymmetrical or symmetrical relationship, where two or more ring carbon atoms of the aromatic hydrocarbon residue are substituted with R or $R^1$ and hydroxyl groups.

Some illustrative non-limiting examples of the halogen-free thiodiphenols of Formula I include: 4,4'-thiodiphenol; 2-methyl-4,4'-thiodiphenol; 2,2'-dimethyl-4,4'-thiodiphenol; 2,2-di-tertiarybutyl-4,4'-thiodiphenol; 2,2',3,3',5,5',6,6'-octamethyl-4,4'-thiodiphenol; 2,2'-diethyl-4,4'-thiodiphenol; 2,2',3,3',6,6'-hexamethyl-4,4'-thiodiphenol; 2-methyl-6-propyl-4,4'-thiodiphenol; and 2,6-dimethyl-4,4'-thiodiphenol.

The 4,4'-thiodiphenols have been found to be particularly useful. Particularly useful 4,4'-thiodiphenols are the 2,2',6,6'-tetraalkyl-4,4'-thiodiphenols such as 2,2',6,6'-tetramethyl-4,4'-thiodephenol, 2,2',6,6'-tetraethyl-4,4'-thiodiphenol, 2,2'-dimethyl-6,6'-diethyl-4,4'-thiodiphenol, and the like.

Some of these thiodiphenols may be prepared by known methods such as those described, for example, in U.S. Pat. No. 3,931,335, which is hereby incorporated by reference.

It is, of course, possible to employ mixtures of two or more different thiodiphenols of Formula I in the practice of the instant invention. Therefore, whenever the term thiodiphenol is used herein it is to be understood that this term encompasses mixtures of two or more different thiodiphenols as well as individual thiodiphenols.

The dihydric phenols employed in the practice of the instant invention to produce the instant polyarylates may be represented by the general formula

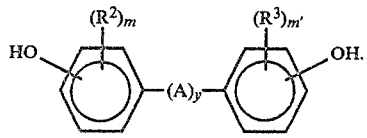

II wherein:

A is selected from divalent hydrocarbon radicals, the —O— radical, and the

radical;

$R^2$ is independently selected from monovalent hydrocarbon radicals, halogen radicals, and hydrocarbonoxy radicals;

$R^3$ is independently selected from monovalent hydrocarbon radicals, halogen radicals, and monovalent hydrocarbonoxy radicals;

y is either 0 or 1; and m and m' are selected from positive integers having a value of from 0 to 4 inclusive.

The divalent hydrocarbon radicals represented by A are selected from alkylene radicals containing from 2 to about 7 carbon atoms, alkylidene radicals containing from 1 to about 7 carbon atoms, cycloalkylene radicals containing from 4 to about 7 carbon atoms in the cyclic structure, and cycloalkylidene radicals containing from 4 to about 7 carbon atoms in the cyclic structure.

Some illustrative non-limiting examples of alkylene and alkylidene radicals represented by A include ethylene, propylene, isopropylene, ethylidene, propylidene, and the like.

When A represents a cycloalkylene or cycloalkylidene radical these radicals may be represented by the general formula

    III wherein Cy is selected from cycloalkylene and cycloalkylidene radicals containing from 4 to about 7 ring carbon atoms, $R^4$ is independently selected from lower alkyl radicals, preferably those containing from 1 to about 5 carbon atoms, and b is a whole number having a value of from 0 up to and including the number of replaceable hydrogen atoms present on Cy, preferably b has a value of from 0 to 6 inclusive.

The monovalent hydrocarbon radicals represented by $R^2$ and $R^3$ are selected from alkyl radicals containing from 1 to about 8 carbon atoms, cycloalkyl radicals containing from 4 to about 7 ring carbon atoms, aryl radicals containing from 6 to 12 carbon atoms, aralkyl radicals containing from 7 to about 12 carbon atoms, and alkaryl radicals containing from 7 to about 12 carbon atoms.

Some illustrative non-limiting examples of the alkyl radicals represented by $R^2$ and $R^3$ include methyl, ethyl, propyl, isopropyl, butyl, isobutyl, pentyl, neopentyl, and hexyl.

The aryl radicals include phenyl, naphthyl, and biphenyl.

The preferred halogen radicals are chlorine and bromine.

The hydrocarbonoxy radicals represented by $R^2$ and $R^3$ are represented by the general formula $-OR^5$ wherein $R^5$ is a monovalent hydrocarbon radical of the type described for $R^2$ and $R^3$.

In the dihydric phenol compounds of Formula II when more than one $R^2$ substituent is present they may be the same or different. The same is true for the $R^3$ substituent. Where y is zero in Formula II the aromatic rings are directly joined with no intervening alkylene or other bridge. The positions of the hydroxyl groups and $R^2$ or $R^3$ on the aromatic nuclear residues can be varied in the ortho, meta, or para positions and the groupings can be in a vicinal, asymmetrical or symmetrical relationship where two or more ring carbon atoms of the aromatic hydrocarbon residue are substituted with $R^2$ or $R^3$ and hydroxyl groups.

The dihydric phenols of Formula II are well known to those skilled in the art. Some illustrative non-limiting examples of the dihydric phenols of Formula II include:

2,2-bis(4-hydroxphenyl)propane (bisphenol-A);
2,4'-dihydroxydiphenylmethane;
bis (2-hydroxyphenyl)methane;
bis(4-hydroxyphenyl)methane;
1,1-bis(4-hydroxyphenyl)ethane;
1,3-bis(3-methyl-4-hydroxphenyl)propane;
2,2-bis(3,5-dibromo-4-hydroxyphenyl)propane;
2,2-bis(3-isopropyl-4-hydroxyphenyl)propane;
1,1-bis(4-hydroxyphenyl)cyclohexane;
1,1-bis(3,5-dimethyl-4-hydroxyphenyl)cyclohexane;
bis(3-ethyl-4-hydroxyphenyl)ether;
bis (4-hydroxyphenyl)ether;
3,3'-dimethyl-4-4'-dihydroxydiphenyl; and
bis (4-hydroxyphenyl)cyclohexylmethane.

The preferred dihydric phenols of Formula II are the 4,4'-bisphenols.

A particularly useful dihydric phenol is 2,2-bis(4-hydroxyphenyl)propane, also known as bisphenol-A.

It is, of course, possible to employ mixtures of two or more different dihydric phenols of Formula II in the practice of the instant invention. Therefore, whenever the term dihydric phenol is employed herein it is to be understood that this term encompasses mixtures of two or more different dihydric phenols as well as individual dihydric phenols.

The aromatic dicarboxylic acids which are reacted with the thiodiphenols of Formula I and the dihydric phenols of Formula II to produce the polyarylates of the instant invention are well known and are generally commercially available or may be prepared by known methods. In general, any aromatic dicarboxylic acid conventionally used in the preparation of polyesters may be utilized. These aromatic dicarboxylic acids may be represented by the general formula HOOC—Ar—COOH tm (IV)

wherein Ar is selected from divalent aromatic radicals. The preferred aromatic radicals are those containing from 6 to about 18 ring carbon atoms, such as phenylene, naphthylene, biphenylene, substituted phenylene, substituted naphthylene and substituted biphenylene. These divalent aromatic radicals when substituted are preferably substituted with monovalent hydrocarbon radicals, preferably alkyl radicals, and halogen radicals, preferably chlorine or bormine.

Preferred aromatic dicarboxylic acids of Formula IV are those represented by the general formula

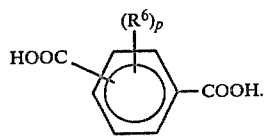    V wherein $R^6$ is independently selected from alkyl radicals, preferably those containing from 1 to about 6 carbon atoms, and halogen radicals, preferably chlorine and bromine. In Formula V p represents a positive integer having a value of from 0 to 4 inclusive. In Formula V when more than one $R^6$ substituent is present they may be the same or different.

Some particularly useful aromatic dicarboxylic acids of Formula V include isophthalic acid, terephathalic acid, and mixtures thereof.

Instead of using the aromatic dicarboxylic acids per se it is possible, and sometimes even preferred, to utilize their respective reactive derivatives. Particularly useful reactive derivatives of the aromatic dicarboxylic acids are the acid halides, with the acid chlorides being the preferred acid halides. Thus, for example, instead of using isophthalic acid, terephthalic acid, or mixtures thereof, it is possible to utilize isophthaloyl dichloride, terephthaloyl dichloride, or mixtures thereof.

In the preparation of the instant polyarylates only one particular aromatic dicarboxylic acid may be used, or a mixture of two or more different aromatic dicarboxylic acids may be employed.

The preparation of the instant polyarylates may be accomplished by known methods such as, for example, heterogeneous interfacial polymerization, solution condensation polymerization, and melt condensation polymerization.

Most conveniently, the instant polyarylates may be prepared from equimolar or nearly equimolar amounts of (i) at least one aromatic dicarboxylic acid or a reactive derivative thereof, and (ii) from about 1 to about 100 weight percent of at least one thiodiphenol of Formula I and from 0 to about 99 weight percent of at least one dihydric phenol of Formula II, based on the total amounts of said thiodiphenol and said dihydric phenol used, by the heterogeneous interfacial polymerization technique. In accordance with the usual heterogeneous interfacial polymerization procedure the reactants are present in different liquid phases which are immiscible and which, in the preparation of the present polymers, constitute two solvent media. Thus, the thiodiphenol and dihydric phenol are dissolved in one solvent medium, the aromatic dicarboxylic acid or its reactive derivative is dissolved in a second solvent medium immiscible with the first, and the solutions are combined. Normally, an alkaline aqueous medium serves as the solvent for the thiodiphenol an dihdyric phenol and an organic solvent is utilized for the acid or its reactive derivative, said organic solvent being so chosen that it either dissolves the polyarylate produced or serves as a swelling medium therefor. Also present during the reaction are catalysts and chainterminators or molecular weight regulators.

The catalysts which can be employed may be any of the well known catalysts which aid the interfacial polymerization reaction. Suitable catalysts include, but are not limited to, tertiary amines such as triethylamine, quaternary ammonium compounds, and quaternary phosphonium compounds.

The molecular weight regulators employed may be any of the well known compounds that regulate the molecular weight of the polyarylates by a chain terminating mechanism. These compounds include, but are not limited to, phenol, tertiarybutyl phenol, and chroman-I.

The temperature at which the polymerization reaction proceeds may vary from below 0° C. to above 100° C. The polymerization reaction proceeds satisfactorily at temperatures from room temperature (25° C) to about 50° C.

The polyarylates of the instant invention generally have a weight average molecular weight in the range of from about 5,000 to about 200,000, preferably from about 10,000 to about 1000,000.

the polyarylates of the instant invention may be prepared by either (i) reacting at least one aromatic dicarboxylic acid with at least one thiodiphenol of Formula I (hereinafter referred to as resin A); or (ii) by reacting at least one aromatic dicarboxylic acid with at least one thiodiphenol of Formula I and at least one dihydric phenol of Formula II (hereinafter referred to as resin B). Polyarylate resins A will contain at least one repeating structural unit represented by the general formula

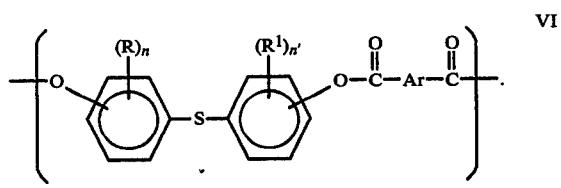

wherein R, $R^1$, n, n', and Ar are as defined above.

Polyarylate resins B will contain at least one repeating structural unit represent by Formula VI and at least one repeating structural unit represented by the general formula

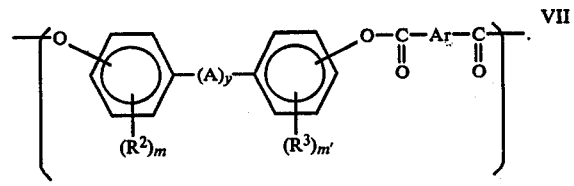

The amounts of structural units of Formula VI and VII present in resin B will depend upon the amounts of thiodiphenol and dihydric phenol used. The greater the amount of the dihydric phenol used, the greater the amount of structural units of Formula VII present in polyarylate resin B.

The amount of thiodiphenol of Formula I used in the preparation of resins B is an amount effective to render the resultant polyarylate resin B flame retardant. Generally, this amount is at least about 1 weight percent, based on the total amount of thiodiphenol and dihydric phenol utilized. In general, if less than about 1 weight percent of the thiodiphenol of Formula I is used in making resin B, the resultant resin will not be sufficiently flame retardant for most commercial applications. Thus, resin B will be formed using from about 1 to about 99 weight percent thiodiphenol and from about 99 to about 1 weight percent dihydric phenol, based on the total amount of thiodiphenol and dihydric phenol used.

Particularly useful polyarylate resins B are those obtained by the reaction of (i) at least one aromatic dicarboxylic acid or a reactive derivative thereof, and (ii) from about 20 to about 70 weight percent of at least one thiodiphenol and from about 80 to about 30 weight percent of at least one dihydric phenol, based on the total amount of thiodiphenol and dihydric phenol used.

The instant polyarylates may have admixed therewith the commonly known and used additives such as inert fillers such as clay, mica, talc and glass fibers; antioxidants; hydrolytic stabilizers; color stabilizers; and the like.

DESCRIPTION OF THE PREFERRED EMBODIMENT

In order to more fully and clearly illustrate the present invention the following examples are set forth. It is intended that these examples be considered as illustrative rather than limiting the invention as disclosed and claimed herein. In the examples all parts and percents are on a weight basis, unless otherwise indicated.

the following example illustrates a prior art polyarylate falling outside the scope of the instant invention. This example is present for comparative purposes.

EXAMPLE 1

This example illustrates a prior art polyarylate which is derived from bisphenol-A and isophthaloyl dichloride.

To a reaction vessel there are added 22.8 grams (0.1 mole) of bisphenol-A, 0.19 gram (2 mole %) of phenol, 0.28 milliliter of thriethylamine, 500 milliliters of methylene chloride, and 300 milliliters of water. This mixture is well stirred and to this stirred mixture there is added dropwise a solution of 20.3 grams (0.1 mole) of isophthaloyl dichloride in 50 milliliters of methylene chloride, while maintaining the pH of the resulting mixture at 11 by the addition of a 25% aqueous sodium hydroxide solution via an automated titrator. When the pH remains constant the organic and aqueous phases are separated, the methylene chloride phase is washed with 0.01 N aqueous HCl, followed by two water washes. The organic layer is then dried with silica gel, filtered and the polyarylate resin is precipitated with methanol.

After drying in a vacuum oven, the polyarylate resin is compression molded at about 600° F. into test bars of about $5'' \times \frac{1}{2}'' \times$ about 1/16 "and $\frac{1}{8}''$ thick and subjected to the test procedure set forth in Underwriters' Laboratories, Inc. Bulletin UL-94, Burning Test for Classified Materials. In accordance with this test procedure materials that pass the test are rated V-O, V-I or V-II based on the results of 5 specimens. The criteria for each V (for vertical) rating per UL-94 is briefly as follows:

"V-O":
Average flaming and/or glowing after removal of the igniting flame shall not exceed 5 seconds and none of the specimens shall drip flaming particles which ignite absorbent cotton.

"V-I":
Average flaming and/or glowing after removal of the igniting flame shall not exceed 25 seconds and the glowing does not travel vertically for more than $\frac{1}{8}''$ of the specimen after flaming ceases and glowing is incapable of igniting absorbent cotton.

"V-II":
Average flaming and/or glowing after removal of the igniting flame shall not exceed 25 seconds and the specimens drip flaming particles which ignite absorbent cotton.

In addition, a test bar which continues to burn for more than 25 seconds after removal of the igniting flame is classified, not by UL-94, but by standards of the invention, as "burns". Further, UL-94 requires that all test bars in each test group must meet the V-type rating to achieve the particular classification. Otherwise, the 5 test bars receive the rating of the worst single bar. For example, if one bar is classified as V-II and the other four bars are classified as V-O, then the rating for all 5 bars is V-II.

The results of these tests are set forth in Table I.

The following examples illustrate the preparation of polyarylates of the instant invention.

EXAMPLE 2

This example illustrates the preparation of poly(4,4'-thiodiphenol isophthalate).

To a reaction vessel there are added 21.8 grams (0.1 mole) of 4,4'-thiodiphenol, 0.9 gram (2 mole %) of phenol, 0.28 milliliter of triethylamine, 500 milliliters of methylene chloride, and 300 milliliters of water. This mixture is well stirred and to this stirred mixture is added dropwise a solution of 20.3 grams (0.1 mole) of isophthaloyl dichloride in 50 milliliters of methylene chloride, while maintaining the pH of the resulting mixture at 11 by the addition of a 25% aqueous sodium hydroxide solution via an automated titrator. When the pH remains constant the organic and aqueous phases are separated, the methylene chloride phase is washed with 0.01N aqueous HCl, followed by two water washings. The organic layer is then dried with silica gel, filtered and the polyarylate resin precipitated by methanol.

After drying in a vacuum oven the polyarylate resin is compression molded at about 600° F. into test bars of about $5'' \times \frac{1}{2}b'' \times 1/16''$ and $\frac{1}{8}''$ thick and subjected to the test procedure UL-94. The results of this test are set forth in Table I.

EXAMPLE 3

This example illustrates the preparation of a copolyarylate resin of 4,4'-thiodiphenol and bisphenol-A.

The procedure of Example 2 is substantially repeated, except that the 21.8 grams of 4,4'-thiodiphenol are replaced with 10.9 grams of 4,4'-thiodiphenol and 11.4 grams of bisphenol-A.

Test bars are prepared substantially in accordance with the procedure of Example 2. These test bars are subjected to test procedure UL-94. The results of this test are set forth in Table I.

TABLE I

| Example No. | UL-94 rating |
|---|---|
| 1 | Burns |
| 2 | V-O |
| 3 | V-O |

As illustrated by the data in Table 1 the instant polyarylates exhibit flame retardancy. Generally the polyarylates of this invention will also demonstrate better thick section impact.

Obviously, other modifications and variation of the present invention are possible in light of the above teachings. It is, therefore, to be understood that changes may be made in the particular embodiment of the invention described which are within the full intended scope of the invention defined by the appended claims.

What is claimed is:
1. A polyarylate resin exhibiting flame retardancy "consisting essentially of the reaction products of"
   (i) isophthalic acid or an ester forming reactive derivative thereof; and
   (ii) at least one thiodiphenol.
2. the resin of claim 1 wherein said thiodiphenol is represented by the general formula

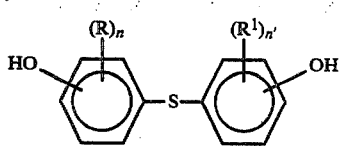

wherein:

R is independently selected from the group consisting of monovalent hydrocarbon radicals;

R¹ is independently selected from the group consisting of monovalent hydrocarbon radicals; and n and n' are independently selected from whole numbers having a value of from 0 to 4 inclusive.

3. The resin of claim 5 wherein said monovalent hydrocarbon radicals are selected from the group consisting of alkyl radicals, aryl radicals, aralkyl radicals, and alkaryl radicals.

4. The resins of claim 3 wherein said monovalent hydrocarbon radicals are selected from alkyl radicals.

5. The resins of claim 4 wherein said thiodiphenol is selected from 4,4'-thiodiphenols.

6. The resin of claim 2 wherein said ester forming reactive derivative of said isophthalic acid is isophthaloyl dichloride.

* * * * *